US009819571B2

United States Patent
Yamashita et al.

(10) Patent No.: US 9,819,571 B2
(45) Date of Patent: Nov. 14, 2017

(54) CONTROL APPARATUS AND METHOD FOR SUPPLYING SWITCH WITH ENTRY

(71) Applicant: FUJITSU LIMITED, Kawasaki-shi, Kanagawa (JP)

(72) Inventors: Shinji Yamashita, Kawasaki (JP); Akiko Yamada, Kawasaki (JP); Sho Shimizu, San Jose, CA (US); Toshio Soumiya, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 111 days.

(21) Appl. No.: 14/666,466

(22) Filed: Mar. 24, 2015

(65) Prior Publication Data

US 2015/0281077 A1 Oct. 1, 2015

(30) Foreign Application Priority Data

Mar. 26, 2014 (JP) .................................. 2014-063728

(51) Int. Cl.
*H04L 12/50* (2006.01)
*H04L 12/751* (2013.01)
*H04L 12/715* (2013.01)

(52) U.S. Cl.
CPC .............. *H04L 45/02* (2013.01); *H04L 45/64* (2013.01)

(58) Field of Classification Search
CPC combination set(s) only.
See application file for complete search history.

(56) References Cited

U.S. PATENT DOCUMENTS

| 6,738,352 | B1 | 5/2004 | Yamada et al. | |
| 8,478,707 | B1* | 7/2013 | Ong | H04L 45/54 706/47 |
| 8,762,501 | B2* | 6/2014 | Kempf | H04L 12/4633 709/220 |
| 8,787,388 | B1* | 7/2014 | Adams | H04L 45/38 370/244 |
| 9,154,433 | B2* | 10/2015 | Koponen | G06F 9/45558 |
| 2008/0159293 | A1 | 7/2008 | Tamai | |
| 2012/0155467 | A1* | 6/2012 | Appenzeller | H04L 45/54 370/392 |
| 2013/0114615 | A1 | 5/2013 | Suemitsu et al. | |
| 2014/0040459 | A1* | 2/2014 | Agrawal | H04L 45/14 709/224 |

FOREIGN PATENT DOCUMENTS

| JP | 10-290232 | 10/1998 |
| JP | 2000-253058 | 9/2000 |
| JP | 2008-167340 | 7/2008 |
| JP | 2013-021678 | 1/2013 |
| WO | 2011/132568 | 10/2011 |

* cited by examiner

*Primary Examiner* — Frank Duong
(74) *Attorney, Agent, or Firm* — Fujitsu Patent Center

(57) ABSTRACT

A control apparatus includes a generation unit to generate a plurality of entries to be supplied with the switch, the plurality of entries being stored in a storage, a transmission unit to transmit to the switch an integration entry that the plurality of entries is integrated in an integration rule, the switch storing the plurality of entries in a table used for processing input packets, an acquisition unit to acquire the plurality of entries from the storage, and a control unit to perform re-integration processing including generating a re-integration entry integrated the plurality of entries and an additional entry in a re-integration rule created based on content of the plurality of entries and the additional entry, the re-integration entry being transmitted to the switch.

9 Claims, 20 Drawing Sheets

FIG. 4    RELATED ART

TABLE (4)

| VM NAME | IP ADDRESS | VLAN-ID | COMMUNICATION DESTINATION VM |
|---|---|---|---|
| VM2-1 | 10.0.0.4 | 20 | VM3-2 |
| VM2-2 | 10.0.0.5 | 20 | VM4-1 |
| VM4-1 | 10.0.1.3 | 20 | VM2-2 |

TABLE (5)

| Src IP | Dst IP | VLAN | Action |
|---|---|---|---|
| 10.0.0.5 | 10.0.1.3 | 20 | Out=p4 |
| 10.0.0.4 | 10.0.1.2 | 20 | Out=p4 |
| 10.0.0.3 | 10.0.1.2 | 10 | Out=p4 |
| * | 10.0.1.1 | * | Out=p4 |

ADD NEW FLOW

INTEGRATION IS POSSIBLE BASED ON Dst-IP AND Action (Dst-IP AND Action ARE COMMON)

INTEGRATED FLOW ENTRY

TABLE (6)

| Src IP | Dst IP | VLAN | Action |
|---|---|---|---|
| 10.0.0.5 | 10.0.1.3 | 20 | Out=p4 |
| * | 10.0.1.2 | * | Out=p4 |
| * | 10.0.1.1 | * | Out=p4 |

INTEGRATED FLOW ENTRY
INTEGRATED FLOW ENTRY

FIG. 11
TABLE <1>
| Src IP | Dst IP | VLAN | Action |
|---|---|---|---|
| 10.0.0.3 | 10.0.1.2 | 20 | Out=p4 |
| 10.0.0.2 | 10.0.1.1 | 20 | Out=p4 |
| 10.0.0.1 | 10.0.1.1 | 10 | Out=p4 |
TABLE <2>
| Src IP | Dst IP | VLAN | Action |
|---|---|---|---|
| 10.0.0.3 | 10.0.1.2 | 20 | Out=p4 |
| * | 10.0.1.1 | * | Out=p4 |
TABLE <3>
| Src IP | Dst IP | VLAN | Action |
|---|---|---|---|
| 10.0.0.5 | 10.0.1.3 | 20 | Out=p4 |
| 10.0.0.4 | 10.0.1.2 | 10 | Out=p4 |
| 10.0.0.3 | 10.0.1.2 | 20 | Out=p4 |
| * | 10.0.1.1 | * | Out=p4 |
RELEASE INTEGRATION ⇑  ADDITIONAL ENTRY

FIG. 13

TABLE <4A>

| Src IP | Dst IP | VLAN | Action |
|---|---|---|---|
| 10.0.0.5 | 10.0.1.3 | 30 | Out=p4 |
| 10.0.0.4 | 10.0.1.2 | 10 | Out=p4 |
| 10.0.0.3 | 10.0.1.2 | 20 | Out=p4 |
| 10.0.0.2 | 10.0.1.1 | 20 | Out=p4 |
| 10.0.0.1 | 10.0.1.1 | 10 | Out=p4 |

⇧ RELEASE INTEGRATION

⇨ ADD PARAMETER (In-Port)

TABLE <5A>

| In Port | Src IP | Dst IP | VLAN | Action |
|---|---|---|---|---|
| 2 | 10.0.0.5 | 10.0.1.3 | 30 | Out=p4 |
| 2 | 10.0.0.4 | 10.0.1.2 | 10 | Out=p4 |
| 1 | 10.0.0.3 | 10.0.1.2 | 20 | Out=p4 |
| 1 | 10.0.0.2 | 10.0.1.1 | 20 | Out=p4 |
| 1 | 10.0.0.1 | 10.0.1.1 | 10 | Out=p4 |

⇨ INTEGRATION (In-Port)

TABLE <6>

| In Port | Src IP | Dst IP | VLAN | Action |
|---|---|---|---|---|
| 2 | * | * | * | Out=p4 |
| 1 | * | * | * | Out=p4 |

THE NUMBER OF FLOW ENTRIES =2

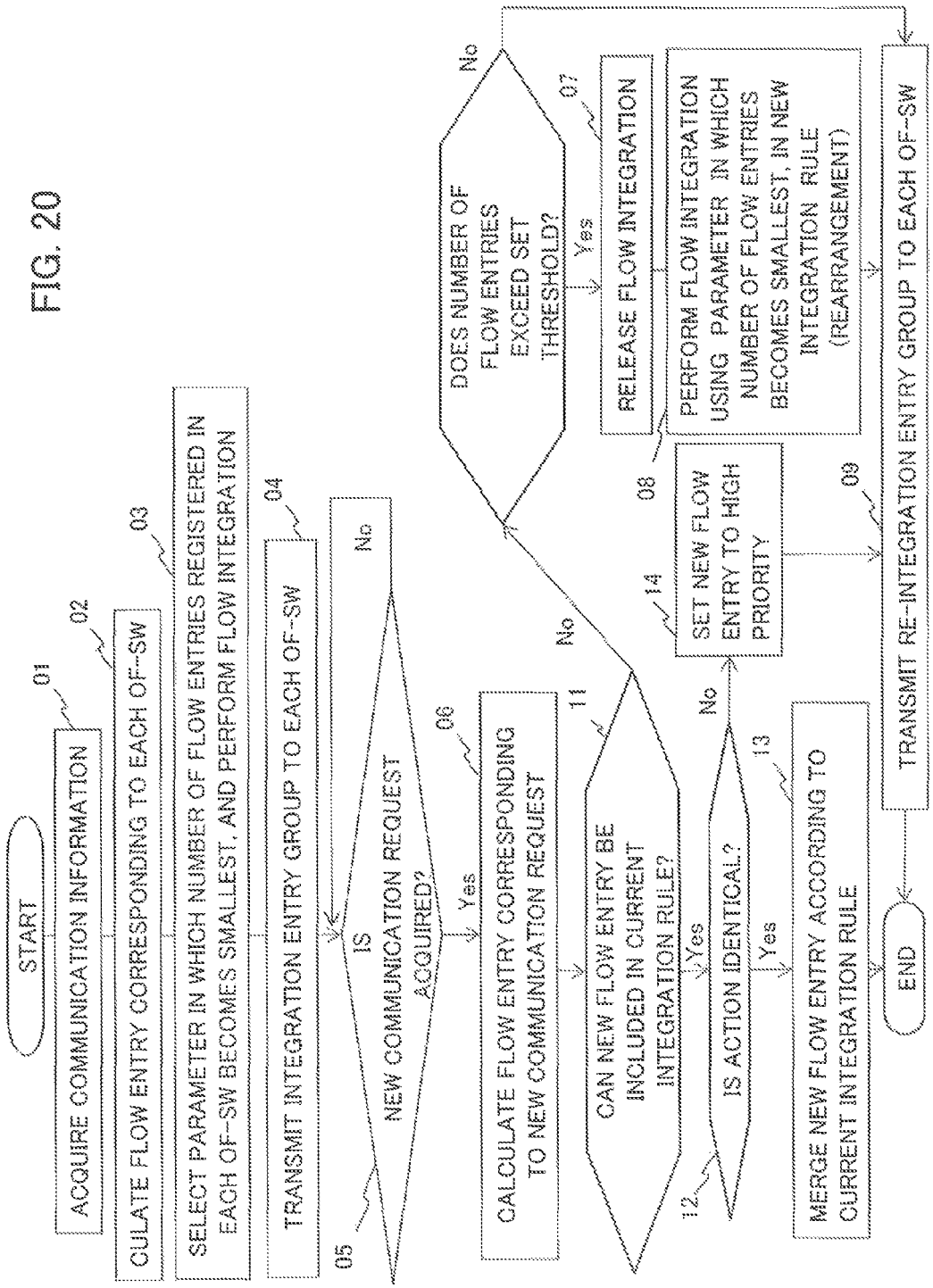

CONTROL APPARATUS AND METHOD FOR SUPPLYING SWITCH WITH ENTRY

CROSS-REFERENCE TO RELATED APPLICATION

This application is based upon and claims the benefit of priority of the prior Japanese Patent Application No. 2014-063728, filed on Mar. 26, 2014, the entire contents of which are incorporated herein by reference.

FIELD

Disclosure relates to a control apparatus and a table creation method thereof.

BACKGROUND

Recently, software defined networking (SDN) is attracting attention in the field of networks. SDN is a technology for controlling the behavior of the entire network by software. An OpenFlow technology is attracting attention as a standard to achieve SDN.

The OpenFlow network includes an "OpenFlow switch" (OF-SW: it may be written as "switch" below) having a data transfer function and an "OpenFlow controller" (OFC: it may be written as "controller" below) that manages path control, where the controller and the switch perform communication according to an "OpenFlow protocol".

Each switch includes a flow table in which information to decide operation (action) with respect to a packet inputted therein is stored. In OpenFlow, a combination of "rule (Match)", "action (Action)" and "statistical information (Statistics)" is called a "flow". The flow table is a set of entries (hereafter referred to as "flow entry") in which information on the flow is stored.

The information on the flow (flow entry) is generated by the controller and transmitted to each switch by the use of "OpenFlow protocol". Each switch stores the flow received from the controller in the flow table. Thus, the controller performs uniform management of the flow table which each switch under the control of the controller itself has.

For more information, see Japanese Laid-open Patent Publication No. 2008-167340, Japanese Laid-open Patent Publication No. 2013-21678, Japanese Laid-open Patent Publication No. 10-290232, Japanese Laid-open Patent Publication No. 2000-253058, and International Publication Pamphlet No. WO2011/132568.

The scalability of the OpenFlow network depends on the throughput of the controller and the number of flow entries that can be registered in the flow table which each switch has. The upper limit of the number of flow entries that can be registered in the flow table is defined by the capacity of a memory installed in the switch.

Therefore, when generating multiple flow entries to be transmitted to the switch, the controller performs integration of the flow entries as follows. That is, the controller refers to parameters included in each flow entry and creates an integration rule in which the number of flow entries after integration becomes the smallest.

Next, according to the integration rule, the controller merges two or more flow entries into one integration entry by an irreversible technique. Further, the controller sends the integration entry and a non-integration entry (in a case where the non-integration entry exists) to the switch. Afterward, in a case where a new flow entry (related to addition) is created, the controller determines whether the additional flow entry can be integrated according to the integration rule, and transmits the additional flow entry to the switch in a case where the integration is difficult.

The above-mentioned controller has the following problem. That is, it is assumed that the parameters used in the above-mentioned integration rule include parameter "A". In this assumption, in a case where the value of parameter "A" in the additional entry and the value of parameter "A" in the above-mentioned integration entry are different, it is difficult to integrate the additional entry into the integration entry. Therefore, every time an additional entry with parameter "A" of a different value is generated, there may occur a case where the number of flow entries held in the switch increases.

The above-mentioned problem is caused by the following reason. That is, the entry integration is performed to reduce the data size of the table. Therefore, when the entry integration is performed, an entry before integration is discarded (deleted). According to such an idea, the controller does not hold the flow entry before integration. Thus, since the flow entry before integration does not exist, the integration rule is not changed even if the number of flow entries increases.

SUMMARY

One of embodiments is a control apparatus supplying a switch with an entry. The switch includes a table formed with one or more entries, each entry including identification information of a packet and operation information. The switch detects an entry corresponding to an input packet from the table based on identification information of the input packet to perform an action with respect to the input packet based on the operation information included in the detected entry. The control apparatus includes a generation unit configured to generate a plurality of entries to be supplied with the switch, the plurality of entries being stored in a storage, a transmission unit configured to transmit an integration entry that the plurality of entries is integrated in an integration rule, to the switch, an acquisition unit configured to acquire the plurality of entries from the storage, and a control unit configured to perform re-integration processing, the re-integration processing including generating a re-integration entry integrated the plurality of entries and an additional entry in a re-integration rule created based on content of the plurality of entries and the additional entry, the re-integration entry being transmitted to the switch.

The target and advantages of the invention will be realized and attained by the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanatory diagram for a problem of the related art;

FIG. 11 is an explanatory diagram of a concrete example of Embodiment 1;

FIG. 13 is an explanatory diagram of a concrete example of Embodiment 1:

FIG. 20 is a flowchart illustrating processing of a CPU in Embodiment 3.

DESCRIPTION OF EMBODIMENTS

In the following, embodiments of the present invention are described with reference to the drawings. The configurations of the embodiments are exemplification, and the present invention is not limited to the configurations of the embodiments.

[Related Art]

Figure 1:
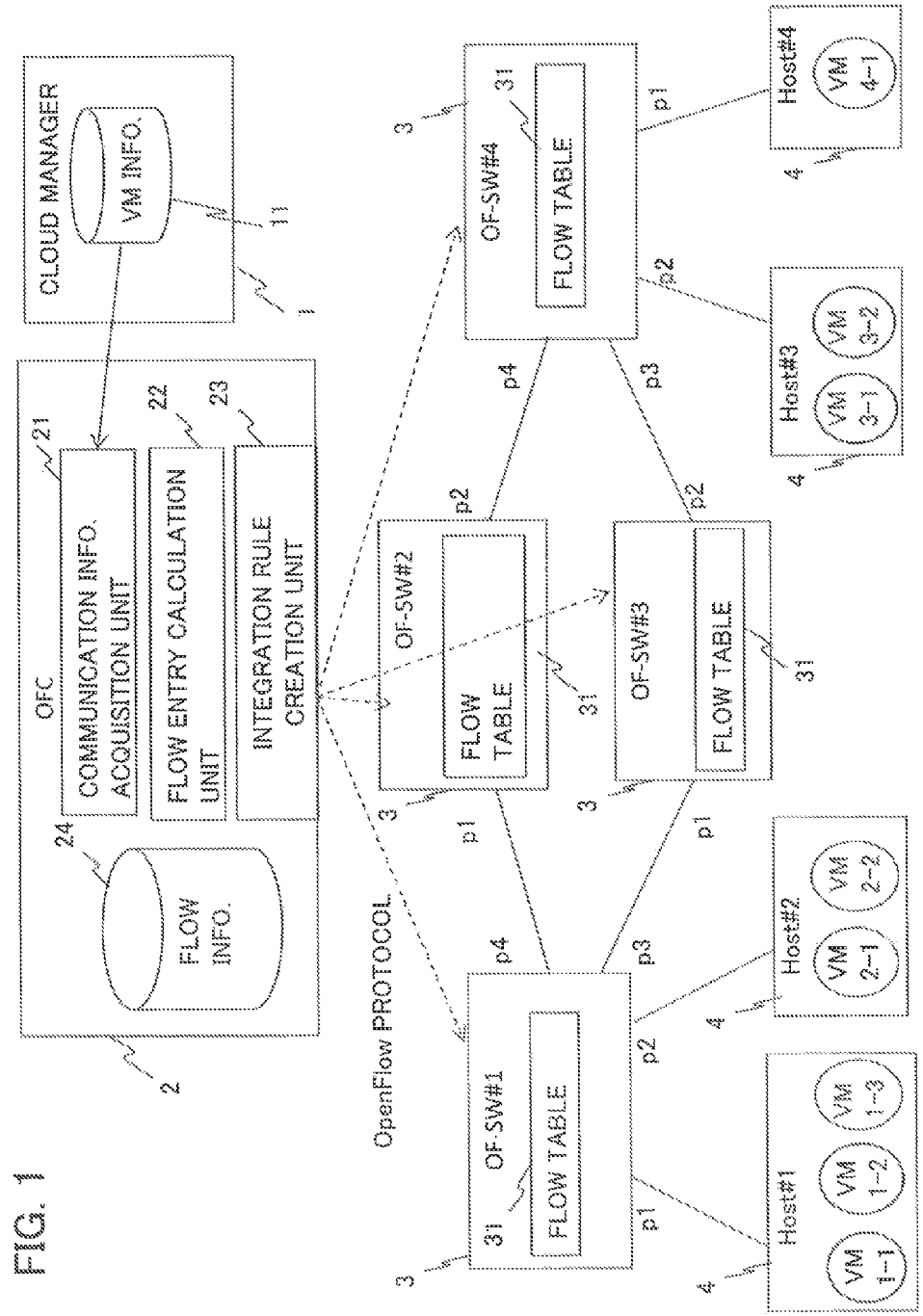
FIG. 1 illustrates a configuration example of a network system according to the related art.

First, the related art of this disclosure is described. FIG. 1 illustrates a configuration example of a network system according to the related art. In FIG. 1, the network system includes a cloud manager 1, a controller (OFC) 2, multiple switches (OF-SW) 3 and multiple hosts (Host) 4. In FIG. 1, switches #1 to #4 are illustrated as an example of multiple switches 3. Moreover, hosts #1 to #4 are illustrated as an example of multiple hosts 4.

The cloud manager 1 performs a setting request related to the generation/deletion of a virtual machine (VM) and the giving of an Internet protocol (IP) address and virtual local area network (VLAN)-ID, and so on, for each of hosts #1 to #4. The VLAN-ID is identification information on a virtual LAN. The cloud manager 1 has a database (DB) 11 that stores information (VM information) on the virtual machine generated in each of hosts #1 to #4.

In the example illustrated in FIG. 1, virtual machine (VM)1-1, VM1-2 and VM1-3 are generated on host #1. Moreover, VM2-1 and VM2-2 are generated on host #2. Moreover, VM3-1 and VM3-2 are generated on host #3. Moreover, VM4-1 is generated on host #4.

Each switch 3 (switches #1 to #4) includes a flow table 31. The flow table 31 is a set of entries (referred to as "flow entry") in which the operation of the switch 3 with respect to individual flows (individual packets inputted in the switch) is described.

Figure 2:
FIG. 2 illustrates one example of a flow table.

FIG. 2 illustrates one example of the flow table 31. The flow entries forming the flow table 31 include "rule (Match)", "action (Action)" and "statistical information (Statistics)" corresponding to the flow identification information (flow ID).

"Rule (Match)" is information indicating the identification condition of a packet inputted in the switch (flow definition condition) and is expressed by a combination of parameters mainly set to the header field of the packet. "Rule" may be referred to as "header field". Parameters defined in OpenFlow include the following ones. "Rule" is one example of "packet identification information".

"Switch Port (Ingress Port): Reception (input) port"
"MAC src: Source MAC (Media Access Control) address"
"MAC dst: Destination MAC address"
"Eth type: Protocol type"
"VLAN-ID"
"VLAN Priority: VLAN PCP (Priority Code Point) value"
"IP src: IP source address"
"IP dst: IP destination address"
"IP Protocol number: Protocol number"
"IP ToS bits: ToS (Type of Service) value"
"Transport src port: Source port number"
"Transport dst port: Destination port number"

"Action" is information that specifies processing of a packet that agrees (matches) with "Rule". For example, as illustrated in FIG. 2, there is the following one. "Action" is one example of "operation information".

"ALL: Transfer to all other ports"
"CONTROLLER: Transfer to controller"
"LOCAL: Transfer to one specific port"
"TABLE: Execution of action of flow table"
"IN_PORT: Transmission to reception port (output from reception port)"

Multiple actions can be defined for "Action". Moreover, when "Action" is not defined, "Drop: packet discard" can be performed. As statistical information, the number of packets or the amount of packets that agree with a certain rule are counted. Such statistical information can be used as a condition to execute the action.

The switch (OF-SW) 3 compares the header field of an inputted packet and "Rule." When a matching rule is found, the switch refers to "Action" in an entry in which the rule is stored and performs operation defined by "Action". For example, when a packet input in the switch 3 agrees with "Rule1" stored in the flow entry of flow ID "1" in FIG. 2, the switch 3 transmits the packet from port p1 according to the content of "Action". Here, the statistical information on the flow entry of flow ID "1" means that, for example, packets of "1000byte" are transferred.

The controller (OFC) 2 includes a communication information acquisition unit 21, a flow entry calculation unit 22, an integration rule creation unit 23 and a flow information storage unit 24. The communication information acquisition unit 21 acquires inter-virtual-machine (VM) communication information (the IP address and VLAN-ID, and so on, of each VM) from a DB 11 in the cloud manager 1. The inter-VM communication information is inputted in the controller 2 before inter-VM communication corresponding to the inter-VM communication information is actually performed.

The flow entry calculation unit 22 generates a flow entry corresponding to each of the switches 3 (each of the switches #1 to #4) by the use of the inter-VM communication information. An integration rule creation unit 33 creates an integration rule with respect to multiple flow entries generated in the flow entry calculation unit 22 and generates an integration entry group into which multiple entries are integrated according to the integration rule, for each switch 3. Each integration entry group is transmitted to a corresponding switch 3 and registered in the flow table 31 of each of the switches 3.

Moreover, the integration entry group transmitted to each of the switches 3 is stored in the flow information storage unit 24 as flow information. Thus, the controller 2 can centrally manage the registration content of the flow table 31 of each of the switches 3.

The switch 3 having received the integration entry group stores (registers) the integration entry group in the flow table 31. The registration into the flow table 31 is performed before actual inter-VM communication is started. Thereby, it is designed so as not to input a packet related to an unknown flow in the switch 3 and cause packet-in processing (operation to make an inquiry about action with respect to an unknown flow to the controller 2).

Figure 3:
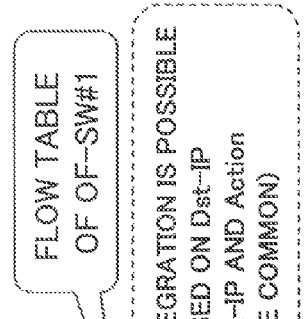
FIG. 3 illustrates an example of a flow entry integration procedure by a controller in the related art.

FIG. 3 illustrates an example of a flow entry integration procedure by the controller in the related art. The communication information acquisition unit 21 of the controller acquires the inter-VM communication information from the DB 11 in the cloud manager 1. Table (1) in FIG. 3 illustrates one example of the inter-VM communication information acquired from the DB 11. An example is illustrated where "VM name", "IP address", "VLAN-ID" and "communication destination VM" are acquired for each of VM1-1, VM1-2, VM1-3, VM3-1 and VM3-2 as the inter-VM communication information.

Next, the flow entry calculation unit 22 generates a set of flow entries (flow table) corresponding to each of the switches 3 (switches #1 to #4) on the basis of the inter-VM communication information. Table (2) in FIG. 3 illustrates the result of calculating flow entries for switch #1 by the flow entry calculation unit 22. In the example of table (2), three flow entries for switch #1 are generated.

The flow entry includes "Src-IP: IP source address", "Dst-IP: IP destination address" and "ULAN-ID" as "Rule" and "Action" corresponding to the rule. For example, the top flow entry in table (2) defines that a packet with IP source address "10.0.0.3", IP destination address "10.0.1.2" and ULAN-ID "10" is output (transmitted) from port p4.

The integration rule creation unit 23 determines whether the set of flow entries generated (calculated) by the flow entry calculation unit 22 can be integrated, and, for example, integrates the flow entries on the basis of a parameter in which the number of flow entries becomes the smallest.

In the example of table (2), the content of parameter "Action" is common. Moreover, the value of parameter "Dst-IP" is common in the second and third flow entries from the top. Moreover, the value of parameter "ULAN-ID" is common in the first and third flow entries from the top. Therefore, it is understood that it is possible to integrate the flow entries by the use of "Dst-IP" or "ULAN-ID". In this case, a parameter used for integration is decided according to a predetermined rule (priority) defined beforehand. In the example of FIG. 3, it is assumed that the integration rule creation unit 23 pays attention to "Dst-IP" and creates an integration rule in which flow entries with common "Dst-IP" and "Action" are integrated.

Table (3) in FIG. 3 illustrates an example where the flow entry group in table (2) is integrated according to the integration rule. In table (3), the second and third flow entries from the top in table (2) are merged and converted into one integration entry. Asterisk "*" in the integrated flow entry means "Don't care (anything is OK)" (it is also referred to as "wild card").

The content (integration entry group) of table (3) is transmitted to switch #1 and stored in the flow information storage unit 24. The flow information storage unit 24 is used to manage the flow table 31 in each of the switches 3. Therefore, the flow entries before integration, that is, the content of table (2) is discarded.

As understood from the above explanation, the integration of flow entries is irreversible processing of leaving the common part of flow entries before integration and replacing other parts than the common part with "Don't care". Therefore, it is difficult to restore the flow entries before integration from the integration entry.

Hence, the controller 2 maintains the integration rule "flow entries with common 'Dst-IP' and 'Action' are integrated". Thus, since it is difficult to restore flow entries before integration in the related art, an integration rule is not changed, and an originally created integration rule is used in a fixed manner.

FIG. 4 is an explanatory diagram for the problem of the related art. Table (4) illustrated in FIG. 4 indicates an example of inter-VM communication information which is newly acquired from the DB 11 by the communication information acquisition unit 21. The entries included in table (4) indicate the difference with previously acquired table (1), and table (4) indicates three items of newly started inter-VM communication.

The flow entry calculation unit 22 generates a new flow entry according to the content of table (4). The integration rule creation unit 23 reads the content of the flow table of switch #1 (table (3)) stored in the flow information storage unit 24 and adds the new flow entry.

Table (5) in FIG. 4 illustrates a state where new flow entries created on the basis of table (4) are added to table (3) for switch #1. In table (5), the first and second flow entries from the top (two entries enclosed with a broken-line rectangle) correspond to the added flow entries.

The integration rule creation unit 23 merges the second and third flow entries from the top according to a previously created integration rule in table (5). However, since the value of "Dst-IP" is different in the first flow entry from the top, integration is difficult. Therefore, as illustrated in table (6), the content of an integration entry group transmitted to switch #1 enters a state including three flow entries formed with two integration flow entries and one non-integration flow entry. The content of such table (6) is transmitted to switch #1 and stored in the flow information storage unit 24.

Therefore, in the related art, it enters a state where the number of flow entries in the flow table 31 of switch #1 increases every time a flow entry with a different value of "Dst-IP" is newly generated. Thus, in the related art, since the initially created integration rule is used in a fixed manner, a sufficient flow entry number reduction effect is not acquired.

The above-mentioned problem is caused due to the following reason. Originally, since there is an upper limit in the memory capacity to store a table, the integration of entries is performed to reduce the data size of the table. Therefore, in a case where entries are integrated, it is normal that entries before integration are discarded as useless items. In existing communication equipment such as an L3 switch and a router, the discard of entries before integration as mentioned above is performed as a usual thing.

However, in OpenFlow, the controller (path control mechanism) and the switch (packet transfer mechanism) are separated and each thereof can be installed to respective physical devices. In this case, even if a flow entry group before integration is preserved on the controller side, the memory capacity on the switch side is not pressured.

Meanwhile, if flow entries before integration are preserved on the controller side, when a flow entry is added, it is possible to try to re-integrate the flow entries before integration and the added flow entry in an integration rule different from an existing integration rule. In other words, it becomes possible to re-integrate flow entries in an integration rule in which the number of flow entries becomes the smallest at the timing a flow entry is added. In embodiments described below, a controller that can suppress an increase in the number of flow entries by enabling a dynamic integration rule change is described.

[Embodiment 1]

Figure 5:
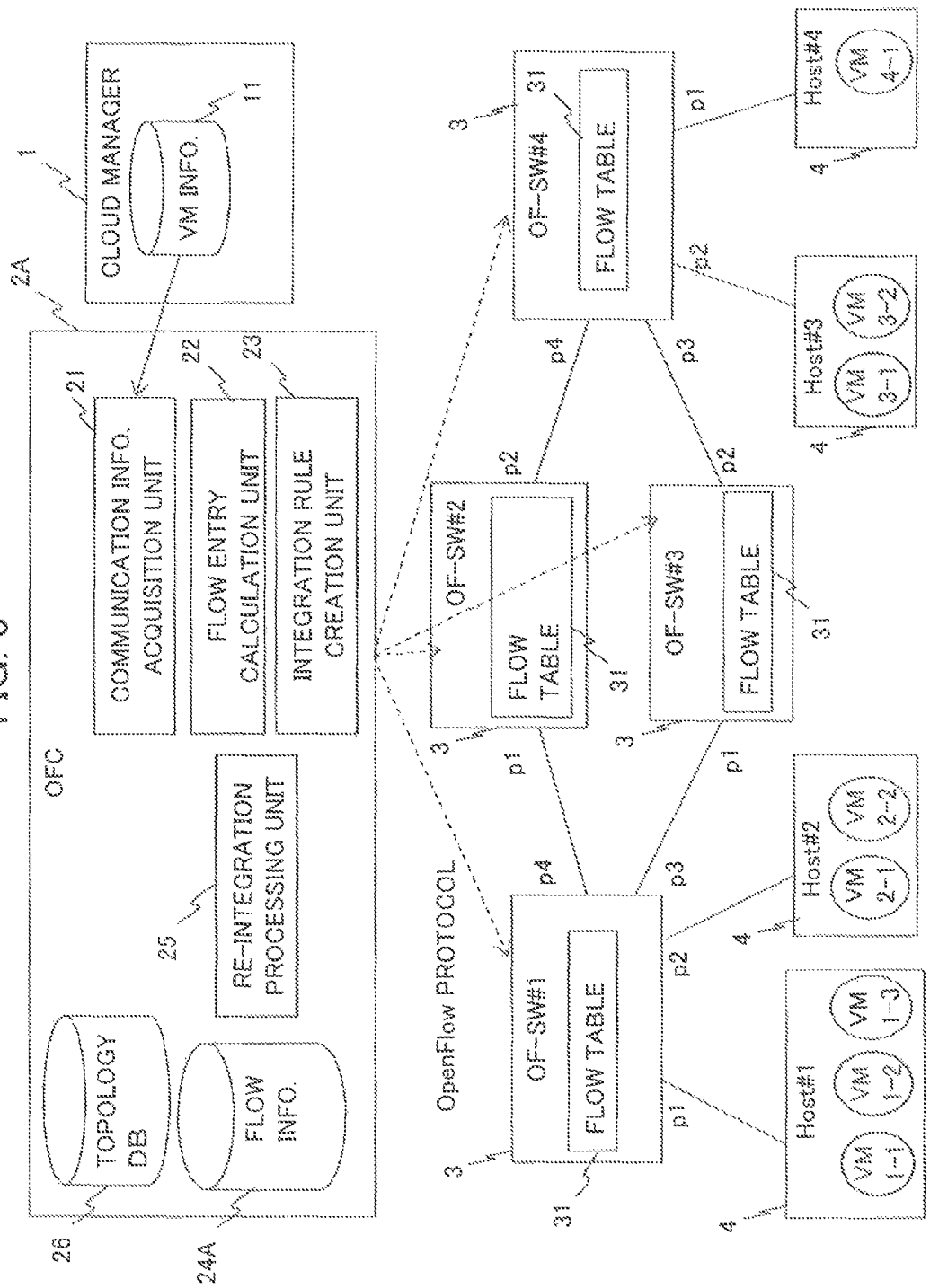
FIG. 5 illustrates a configuration example of a network system according to Embodiment 1.

FIG. 5 illustrates a configuration example of a network system according to Embodiment 1. In FIG. 5, the network system includes the cloud manager 1, a controller (OFC) 2A, a plurality of switches (OF-SW) 3 connected with the controller 2A through a network, and a plurality of hosts (Host) 4. The controller 2A is one example of "control apparatus" or "controller" and the switch 3 is one example of "switch".

The controller 2A is connected with the cloud manager 1 and the plurality of switches 3 through the network. In FIG. 5, switches #1 to #4 are illustrated as exemplification of the plurality of switches 3. Each of the switch #1 and the switch #4 is connected with the switch #2 and the switch #3.

Moreover, in FIG. 5, hosts #1 to #4 are illustrated as an example of a plurality of hosts 4. The host #1 and the host #2 are connected with the switch #1, and the host #3 and the host #4 are connected with the switch #4.

The cloud manager 1 is connected with the hosts #1 to #4 through the network and has a configuration similar to the related art. That is, a setting request related to the generation/deletion of a virtual machine (VM) and the giving of an Internet protocol (IP) address and VLAN-ID, and so on, for each of the hosts #1 to #4. Moreover, the cloud manager 1 includes the database (DB) 11 that stores information (VM information) on the virtual machine generated in each of the hosts #1 to #4.

In FIG. 5, a VM 1-1, a VM 1-2 and a VM 1-3 are generated on host #1. Moreover, a VM 2-1 and a VM 2-2 are generated on host #2. Moreover, a VM 3-1 and a VM 3-2 are generated on host #3. Moreover, a VM 4-1 is generated on host #4.

However, the virtual machine (VM) is exemplification of an entity (subject) that performs communication, and there is no condition that an entity that performs communication is a virtual machine and a host generates the virtual machine. The hosts #1 to #4 themselves (real machines) may be communication entities.

Here, for example, the cloud manager 1 is a server apparatus connected with the network and can be achieved by the use of a dedicated or general-purpose computer. Moreover, each host 4 is a computer (information processing apparatus) having a processor, a memory and a communication interface, such as a personal computer (PC), a work station (WS), a tablet terminal and a smart phone etc. Each host 4 can form a virtual machine (VM) by the processor executing a program.

Similar to the related art, each of the switches 3 (each of the switches #1 to #4) includes the flow table 31. The flow table 31 is a set of flow entries. The data structure of the flow entry (content of the element (field)) is similar to the related art (see FIG. 2). Each of the switches 3 performs communication according to an OpenFlow protocol with the controller 2A. Each of the switches 3 can receive a flow entry registered in the flow table 31 from the controller 2A.

The controller 2A includes the communication information acquisition unit 21, the flow entry calculation unit 22, the integration rule creation unit 23, a flow information storage unit 24A, a re-integration processing unit 25 and a topology database (topology DB) 26.

The communication information acquisition unit 21 acquires inter-virtual-machine (VM) communication information (IP address and VLAN-ID, and so on, of each VM) from the DB 11 in the cloud manager 1. The inter-VM communication information is inputted to the controller 2 before inter-VM communication corresponding to the inter-VM communication information is actually performed. However, as mentioned above, an application range of the embodiment is not limited to the inter-VM communication. The inter-VM communication information is exemplification of communication information between communication entities (transmission host and reception host).

The flow entry calculation unit 22 generates flow entries for each switch 3 by the use of the inter-VM communication information. The set of flow entries (flow entry group) which correspond to each of the switches 3 and which are generated by the flow entry calculation unit 22 is stored in the flow information storage unit 24A as pre-integration flow information. The flow entry calculation unit 22 is one example of "generation unit".

The integration rule creation unit 23 analyzes the content of a plurality of flow entries generated in the flow entry calculation unit 22 and creates an integration rule in which the number of flow entries becomes the smallest at that time. The integration rule creation unit 23 integrates the flow entries according to the created integration rule. Here, the integration rule creation unit 23 is one example of "integration unit".

The flow entries after being integrated by the integration rule creation unit 23 (integration entry group) are transmitted to the corresponding switch 3. In the present embodiment, the content of the entries after integration (content of entries held by the switch 3) is not held on the side of the controller 2A. That is, the controller 2A generates an entry group after integration by the use of flow information (information on the flow entries before integration) optionally stored in the flow information storage unit 24A. However, the integration entry group corresponding to each of the switches 3 can be stored in the flow information storage unit 24A as information indicating the registration content of the flow table 31 in each of the switches 3.

The re-integration processing unit 25 performs re-integration processing in a case where new inter-VM communication information is acquired in the communication information acquisition unit 21 and a flow entry based on the new inter-VM communication information is generated in the flow entry calculation unit 22. The re-integration processing unit 25 is one example of "control unit" or "controller".

The topology DB 26 stores topology information according to the connection relationship between the switches 3. The topology information includes information indicating the switch 3 through which packets pass and the reception port and transmission port of the packets in each of the switches 3, for each inter-VM communication. For example, such information may be statically set or may be acquired by the controller 2A by communication with each of the switches 3.

<Operation Example>

Figure 6:
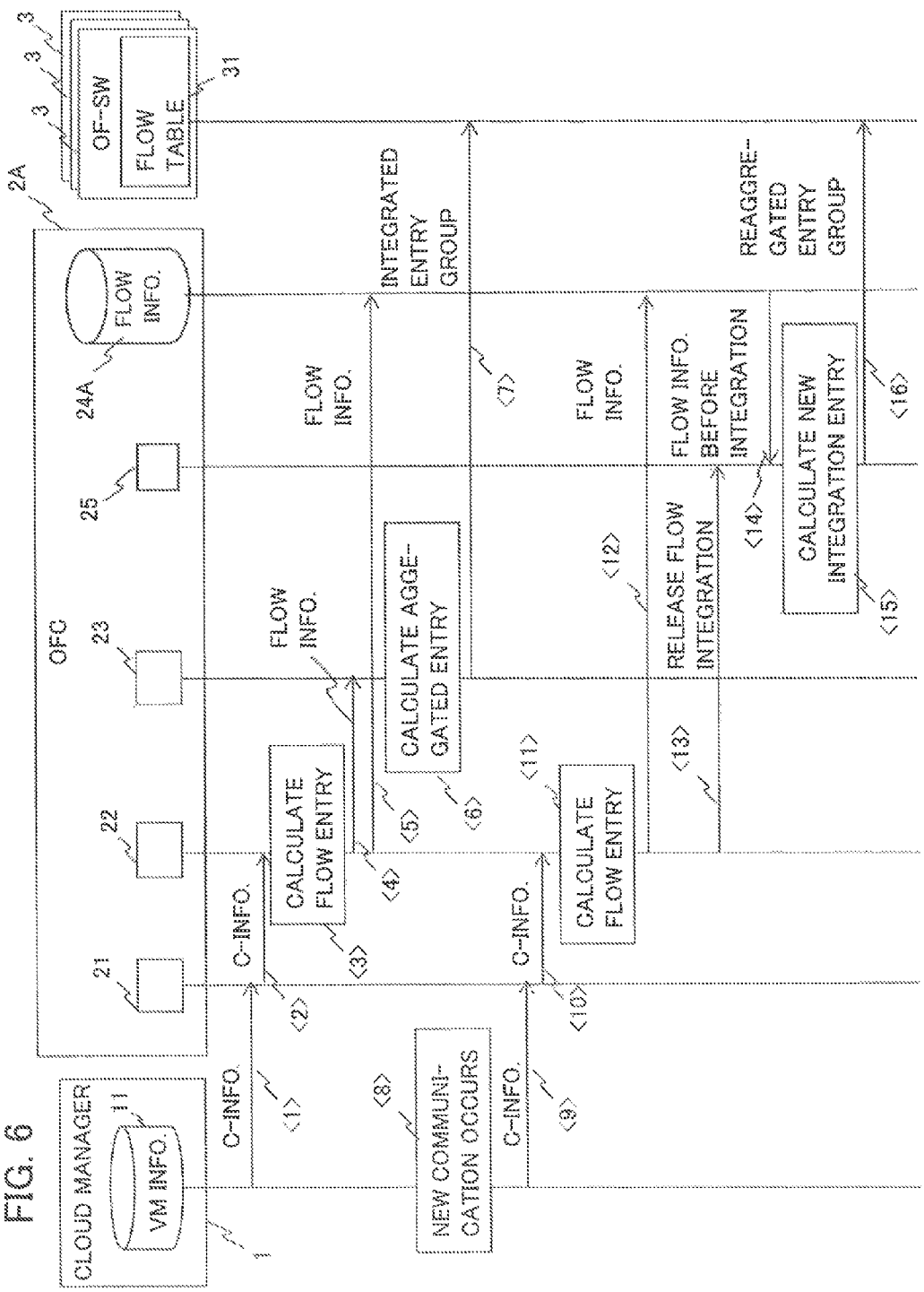
FIG. 6 is a sequence diagram illustrating an operation example of a network system.

FIG. 6 is a sequence diagram illustrating an operation example of a network system. The operation described below is performed for the flow table 31 of each of the switches 3. In FIG. 6, the communication information acquisition unit 21 acquires communication information (C-INFO.) from the cloud manager 1 (FIG. 6 <1>). The communication information acquisition unit 21 gives the communication information to the flow entry calculation unit 22 (FIG. 6 <2>).

The flow entry calculation unit 22 calculates flow entries by use of the communication information (FIG. 6 <3>). The flow entry calculation unit 22 transmits the calculated flow entries (flow entry group) to the integration rule creation unit as flow information (FIG. 6 <4>) and stores the flow information in the flow information storage unit 24A (FIG. 6 <5>).

The integration rule creation unit 23 creates an integration rule with respect to the flow entry group and calculates an integration entry group by use of the created integration rule (FIG. 6 <6>). The integration entry group includes one or more integration entries (entries created by merging a plurality of flow entries) and one or more flow entries that are not integrated (when existing). The integration entry group is transmitted to the corresponding switch 3 (FIG. 6 <7>).

Afterward, when new communication is generated (FIG. 6 <8>), the communication information acquisition unit 21 acquires communication information including the new communication (FIG. 6 <9>) and transmits it to the flow entry calculation unit 22 (FIG. 6 <10>). The flow entry calculation unit 22 calculates flow entries related to the new communication (FIG. 6 <11>). The flow entry calculation unit 22 stores the flow entry group in the flow information storage unit 24 as flow information (FIG. 6 <12>).

In this operation example, re-integration processing is performed in response to the addition of the flow entries. Therefore, the flow entry calculation unit 22 gives a flow entry integration release notice to the re-integration processing unit 25 (FIG. 6 <13>). The re-integration processing unit 25 reads the flow entry group before integration from the flow information storage unit 24 (FIG. 6 <14>).

The re-integration processing unit 25 recreates an integration rule with respect to the flow entry group before integration and generates a re-integration entry group by use of the recreated integration rule (new integration rule) (FIG. 6 <15>). Further, the re-integration entry group is transmitted to the corresponding switch 3 (FIG. 6 <16>). Here, the integration entry group transmitted to the switch 3 in FIG. 6 <7> and the re-integration entry group transmitted to the switch 3 in FIG. 6 <16> may be stored in the flow information storage unit 24A.

<Hardware Configuration of Controller>

Figure 7:
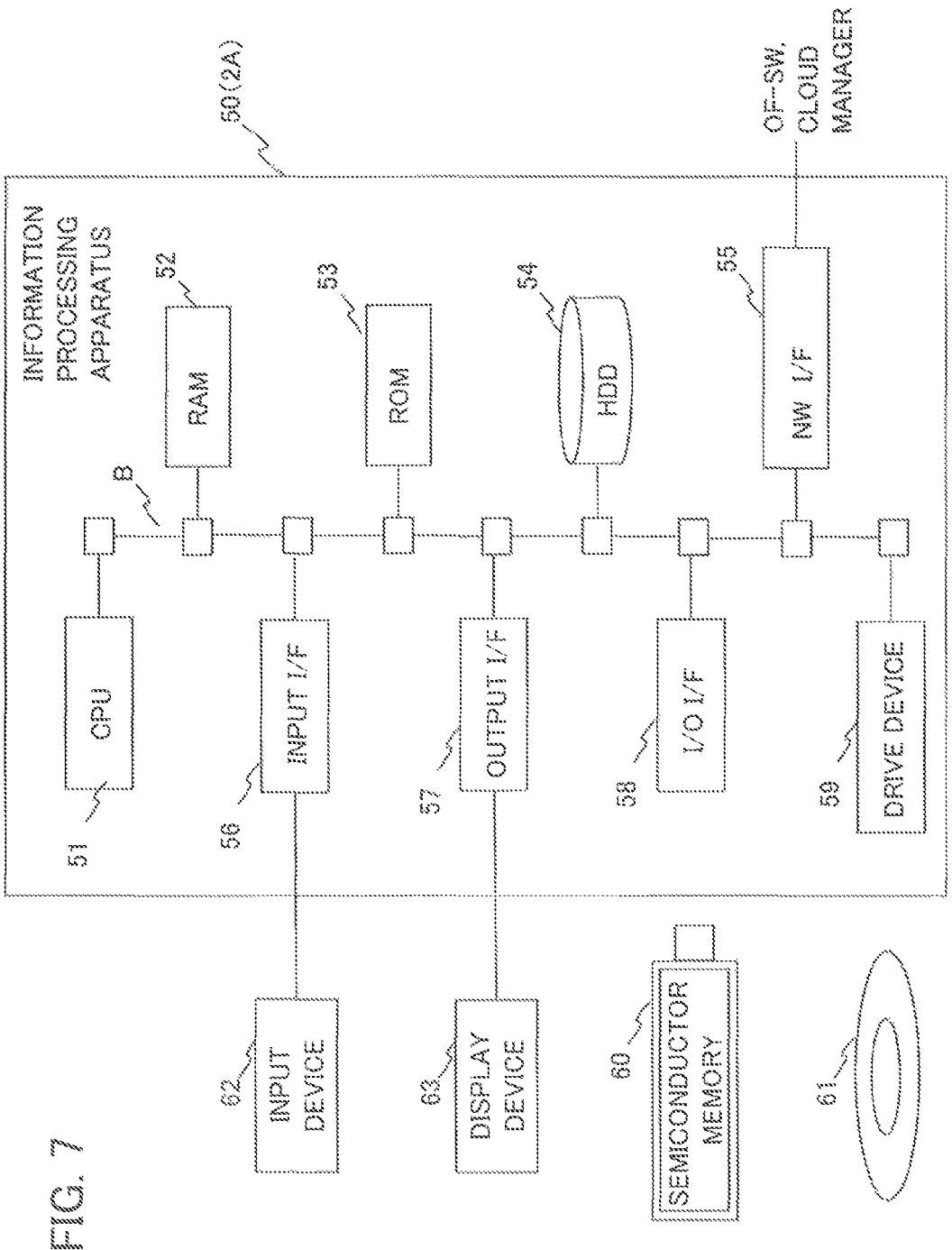
FIG. 7 is a diagram illustrating a hardware configuration example of an information processing apparatus that is operable as a controller.

FIG. 7 is a diagram illustrating a hardware configuration example of an information processing apparatus (computer) 50 that can operate as the controller 2A mentioned above. For example, the information processing apparatus 50 can apply a dedicated or general-purpose computer such as a PC, a WS and a server machine. However, the kind of the information processing apparatus 50 is not limited to the above-mentioned exemplification.

In FIG. 7, the information processing apparatus 50 includes a central processing unit (CPU) 51, a random access memory (RAM) 52 and a read only memory (ROM) 53 that are mutually connected through bus B. Moreover, the information processing apparatus 50 includes a hard disc drive (HDD) 54, a network interface (NW I/F) 55 and an input interface (input I/F) 56 that are connected with the bus B. In addition, the information processing apparatus 50 includes an output interface (output I/F) 57, an input/output interface (I/O I/F) 58 and a drive device 59 that are connected with bus B.

The RAM 52 is used as a work area of the CPU 51 and a storage area of data. Each of the ROM 53 and the HDD 54 stores a program and data used at the time of execution of the program. The HDD 54 can also store data generated as a program execution result. A solid state drive (SSD) may be installed instead of the HDD or in addition to the HDD 54.

A semiconductor memory 60 is detachably connected with the input/output I/F 58. The semiconductor memory 60 is one example of a portable storage medium and stores desired data. The input/output I/F 58 performs reading and writing of the data from the semiconductor memory 60. For example, the semiconductor memory 60 is a flash memory, an Static Random Access Memory (SRAM) or a Universal Serial Bus (USB) memory. However, the type of the semiconductor memory 60 is not limited to these. The drive device 59 reads data or writes data from a disc storage medium 61 which is one example of a removable storage medium. The RAM 52, the ROM 53, the HDD 54, the semiconductor memory 60 and the disc storage medium 61, and so on, are one example of "storage unit", "storage medium", "memory" or "storage device".

An input device 62 is connected with the input I/F 56. For example, the input device 62 includes at least one of a button, a key, a pointing device (such as a mouse) and a touch panel. The input device 62 is used to input information and/or data.

A display device 63 (display apparatus) is connected with the output I/F 57. The display 63 displays various kinds of information. The NW I/F 55 includes an interface circuit that manages a communication function, and is connected with the switch 3 and the cloud manager 1, and so on, through a network. For example, the NW I/F 55 can apply a network interface card such as a LAN card. The NW I/F 55 operates as "transmission unit" and "reception unit" that perform data transmission and reception with each of the switches 3 and the cloud manager 1. For example, the NW I/F 55 operates as a transmission unit that transmits the registration content of the flow table 31 of each of the switches 3 like an integration entry group and a re-integration entry group, to each of the switches 3.

The CPU 51 operates as the controller 2A by loading a program stored in at least one of the ROM 53, the HDD 54, the semiconductor memory 60 and the disk storage medium 61 to the RAM 52 and executing it. The CPU 51 is one example of "processor", "controller" or "control device".

By the program execution, the CPU 51 operates as the communication information acquisition unit 21, the flow entry calculation unit 22, the integration rule creation unit 23 and the re-integration processing unit 25 which are illustrated in FIG. 5. For example, the flow information storage unit 24 and the topology DB 26 are stored in at least one of the RAM 52 and the HDD 54.

Here, at least one of the communication information acquisition unit 21, the flow entry calculation unit 22, the integration rule creation unit 23 and the re-integration processing unit 25 which are illustrated in FIG. 7 may be formed with hardware. For example, the hardware can apply at least one of an electric/electronic circuit and an integrated circuit (at least one of an IC, an LSI and an application specific integrated circuit (ASIC)). Moreover, the hardware can include a programmable logic device (PLD) such as a field programmable gate array (FPGA).

<Hardware Configuration Example of Switch>

Figure 8:
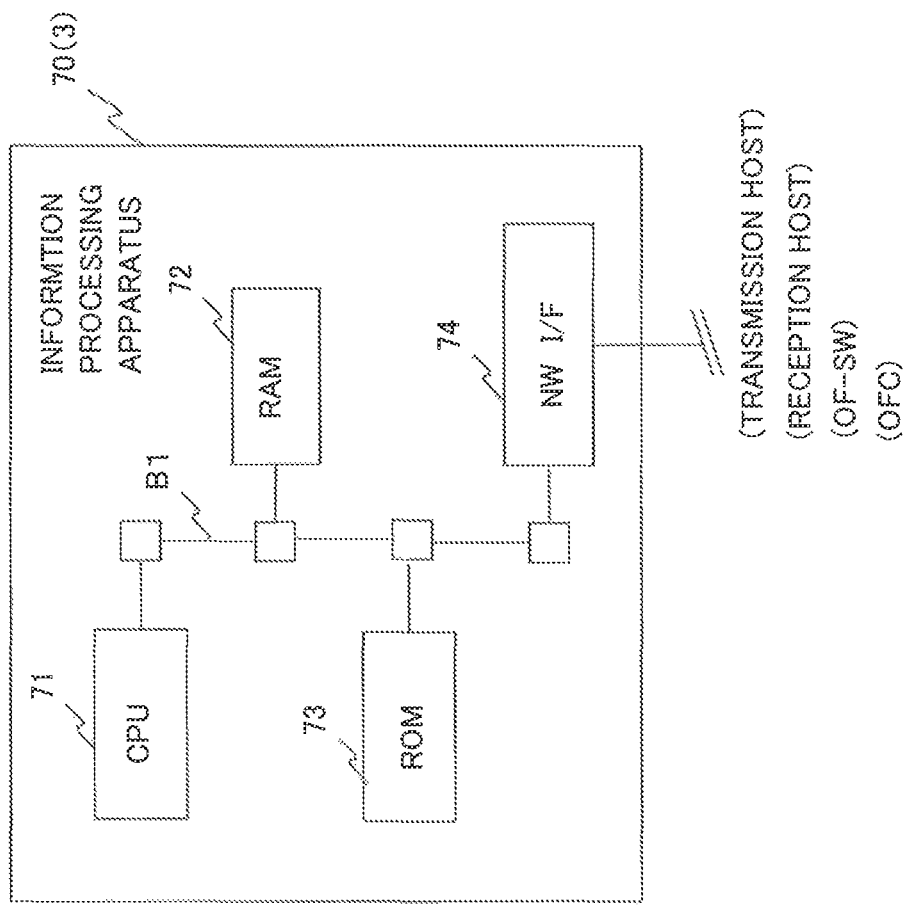
FIG. 8 is a diagram illustrating a hardware configuration example of an information processing apparatus that is operable as a switch.

FIG. 8 is a diagram illustrating a hardware configuration example of an information processing apparatus (computer) 70 that is operable as the switch 3. It is also possible that the information processing apparatus 70 applies a dedicated or general-purpose computer such as a PC, a WS and a server machine, or communication equipment such as an layer 3 (L3) switch and a router. However, the kind of the information processing apparatus 70 is not limited to the above-mentioned exemplification.

In FIG. 8, the information processing apparatus 70 includes a CPU 71, a RAM 72, a ROM 73 and a NW I/F 74 which are mutually connected through bus B1. The RAM. 72 is used as a work area of the CPU 71, a data storage area and a buffer area for data. The ROM 73 stores a program executed by the CPU 71 and data used at the time of execution of the program.

The NW I/F 74 is connected with a transmission host, a reception host, one or more other switches 3 and the controller 2A through a network. The NW I/F 74 manages processing related to communication. That is, the NW I/F 74 transmits a packet, which is received in a predetermined reception port from the transmission host or the other switches 3, from an output port corresponding to an instruction from the CPU 71. Thereby, the packet is received in another switch 3 or reception host corresponding to the next hop.

The CPU 71 operates as the switch 3 by loading the program stored in the ROM 73 to the RAM 72 and executing it. For example, a storage area of the flow table 31 is formed in the RAM 72, and a flow entry received in the NW I/F 74 is stored (registered) in the flow table 31 of the RAM 72.

When a packet is received in the NW I/F 74, the CPU 71 refers to the flow table 31 ("Rule" of each flow entry) and detects a corresponding flow entry. Subsequently, the CPU 71 performs operation (processing) with respect to the packet according to the content of "Action" included in the detected flow entry. For example, the CPU 71 performs processing to transmit (transfer) the packet from an output port defined in "Action".

<Processing in Controller>

Figure 9:
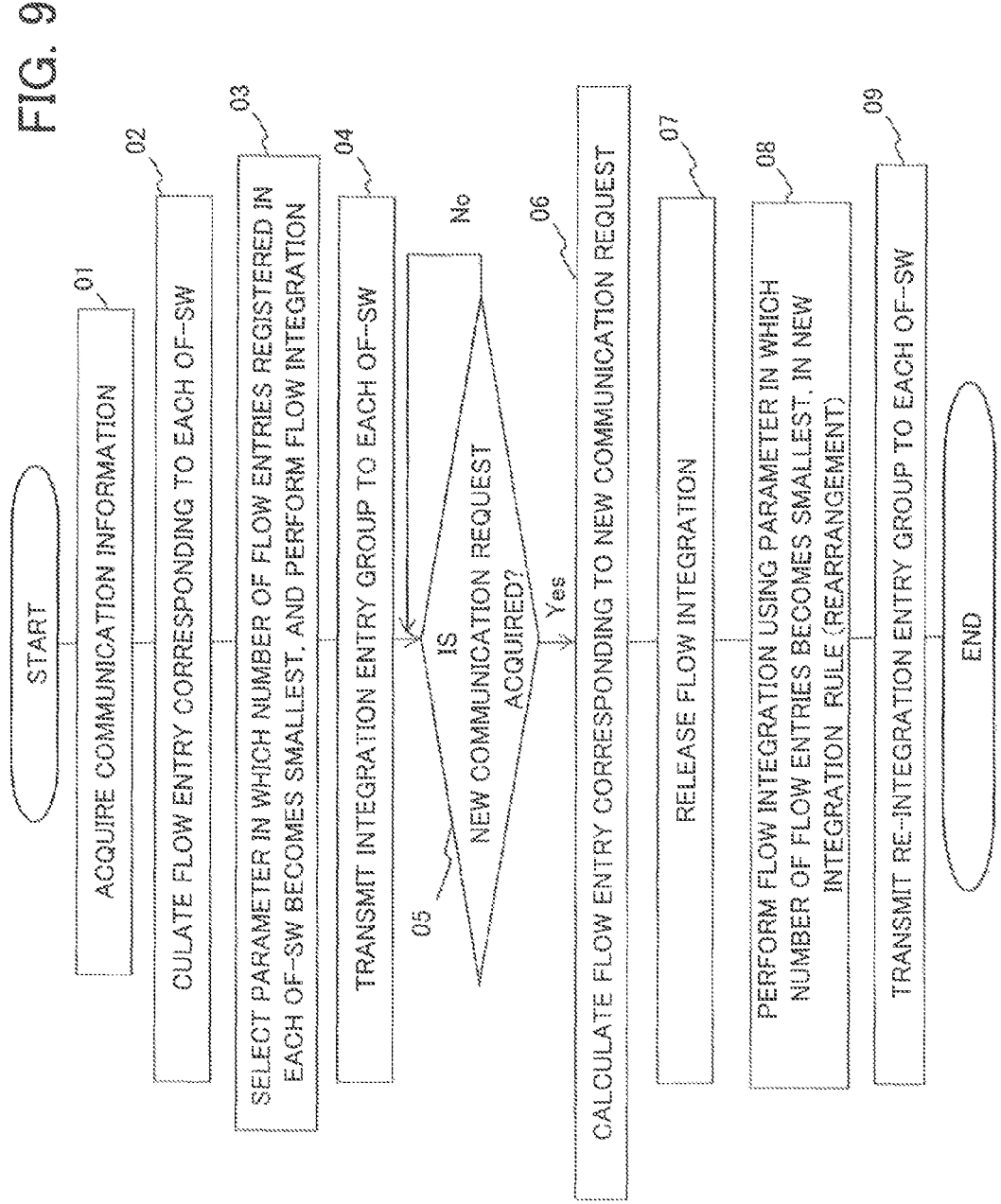
FIG. 9 is a flowchart illustrating a processing example by a CPU illustrated in FIG. 6.
Figure 10:
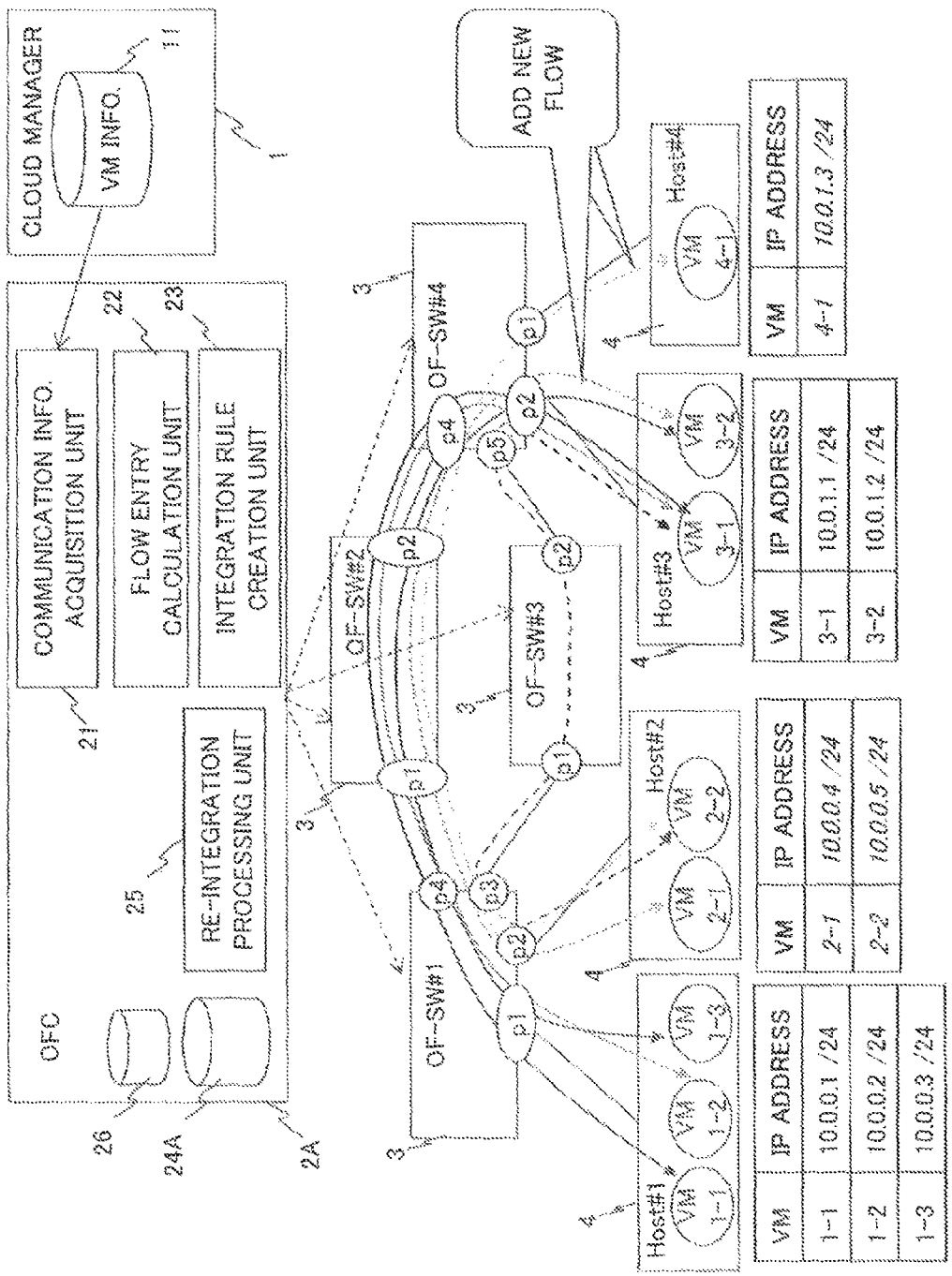
FIG. 10 is an explanatory diagram of a concrete example of Embodiment 1.

FIG. 9 is a flowchart illustrating a processing example by the CPU illustrated in FIG. 6. In 01 in FIG. 6, the CPU 51 operates as the communication information acquisition unit 21 and acquires communication information from the cloud manager 1.

In next 02, the CPU 51 operates as the flow entry calculation unit 22 and calculates flow entries with respect to each switch. At this time, the CPU 51 stores the calculated flow entries (flow entry group before integration) to the flow information storage unit 24A.

In next 03, the CPU 51 operates as the integration rule creation unit 23 and selects a parameter in which the number of flow entries registered in each of the switches 3 becomes the smallest. This selection corresponds to creation of an integration rule. The CPU 51 integrates flow entries by merging the flow entries with a common value of the selected parameter into one integration entry.

In next 04, the CPU 51 performs processing to transmit the integration entry group generated by aggregating the flow entries, to each of the switches 3 through the NW I/F 55. Afterward, the CPU 51 enters a state to wait for a new communication request (communication information) (05).

When the new communication information is acquired, (05, YES), the CPU 51 operates as the flow entry calculation unit 22 and calculates a new (additional) flow entry (06). The CPU 51 releases the integration of flow entries in response to the calculation of the additional flow entry (07).

In next 08, the CPU 51 operates as the re-integration processing unit 25, reads the flow entry group before integration from the flow information storage unit 24A and performs re-integration processing on the flow entry group before integration and the additional flow entry. That is, the CPU 51 decides a parameter in which the number of flow entries becomes the smallest, for the flow entry group before integration and the additional flow entry (integration rule recreation). Subsequently, the CPU 51 generates a re-integration entry group re-aggregating the flow entry group before integration and the additional flow entry in the recreated integration rule. The processing in 07 and 08 is performed for each of the switches 3 related to the additional flow entry.

Further, in next 09, the CPU 51 operates as the re-integration processing unit 25 and performs processing to transmit the re-integration entry group to each of the switches 3 through the NW I/F 55. Here, in FIG. 9, processing ends after processing in 09, but the processing may be returned to 05.

<Concrete Example>

Next, a concrete example of processing in a network system (controller 2A) according to the Embodiment 1 is described. FIGS. 10 to 13 are explanatory diagram of the concrete example of the Embodiment 1. The occurrence state of inter-VM communication in the Embodiment 1 is the same as the related art. First, it is assumed that communication between the VM 1-1 and the VM 3-1, communication between the VM 1-2 and the VM 3-1, and communication between the VM 1-3 and the VM 3-2 are started. At this time, communication information related to this communication is acquired in the communication information acquisition unit 21 of the controller 2A. The content of the communication information is as illustrated in table (1) of FIG. 3.

Then, the flow entry calculation unit 22 of the controller 2A creates flow entries for each of the switches 3, and the integration rule creation unit 23 creates an integration rule and integrates the flow entry group according to the integration rule. Table <1> of FIG. 11 indicates a flow entry group created for switch #1, and table <2> indicates an integration result of the flow entry group (integration entry group). Since a specific technique of creation and integration of an integration rule is similar to the related art, explanation thereof is omitted. In table <2>, in the flow entry group, flow entries with common values of "Dst-IP" and "Action" are integrated.

Afterward, it is assumed that communication between VM2-1 and VM3-2 and communication between VM2-2 and VM4-1 are acquired in the communication information acquisition unit 21 as new (additional) communication information. The content (difference) of communication information is as illustrated in table (4) of FIG. 4.

Then, the flow entry calculation unit 22 creates the first and second flow entries from the top in table <3> of FIG. 11 as additional flow entries. Table <3> indicates a state where the integration entry group of switch #1 and the additional entries (two flow entries enclosed with a broken-line rectangle) are combined.

Figure 12:
FIG. 12 is an explanatory diagram of a concrete example of Embodiment 1.

The re-integration processing unit 25 releases the integration of the integration entry group in response to the addition of the flow entries. FIG. 12 illustrates an example of the first re-integration method. The re-integration processing unit 25 combiners the flow entry group before integration acquired from the flow information storage unit 24A and the additional flow entries into one (see table <4> of FIG. 12).

Next, the re-integration processing unit 25 refers to table <4> and selects a parameter in which the number of flow entries after integration becomes the smallest. In the example illustrated in FIG. 12, it is found that the number of flow entries becomes the smallest in a case where the integration is performed by the use of VLAN-ID.

Then, the re-integration processing unit 25 makes a change to an integration rule in which flow entries with a common value of "ULAN-ID" and common value of "Action" instead of "Dst-IP" (existing integration rule) are merged into an integration entry (recreation of the integration rule). The re-integration processing unit 25 performs integration in the recreated integration rule. As a result of this, a re-integration entry group formed with two integration entries is generated as illustrated in table <5> of FIG. 12.

By such the first re-integration method (parameter change), the number of flow entries registered in switch #1 is 2. In the related art, the number of flow entries is 3 as illustrated in table (6) of FIG. 4. Therefore, according to the Embodiment 1, it is possible to reduce the number of flow entries by re-integration processing.

FIG. 13 illustrates an example of the second re-integration method. A case is assumed where a flow entry group (including an additional flow entry) acquired by integration release has content illustrated in table <4A> of FIG. 13. In this case, even if the flow entries are integrated according to the VLAN-ID, there is a possibility that the number of flow entries is 3 (which is not different from the previous integration rule).

The re-integration processing unit 25 adds a parameter candidate used to create an integration rule. That is, in the first re-integration method, a parameter acquired by communication information acquired from the cloud manager 1 is used as a parameter candidate related to the creation of the integration rule. That is, the source IP address, the destination IP address and the VLAN-ID that are included in the communication information are used as parameter candidates, and a parameter used for the integration rule is selected from these parameter candidates.

In the second re-integration method, a parameter candidate is added. For example, parameter "In_Port (reception port)" is added to each flow entry as illustrated in table <5A> of FIG. 13. Information on "In_Port" is stored in the topology DB 26 beforehand, and the re-integration processing unit 25 can set the information on "In_Port" to each flow entry.

The re-integration processing unit 25 examines whether it is possible to make the number of flow entries become the smallest by selecting an additional parameter candidate, and, in a case where it is possible to make it become the smallest, decides to use the parameter candidate for a new integration rule. Table <6> of FIG. 13 indicates a re-integration entry group re-integrated according to "In_Port". It is possible to make the number of flow entries become 2 by re-integration.

Here, FIG. 13 illustrates an example where "In_Port" is added, but it is also possible to add parameters (which are not already used as a parameter candidate) other than "In_Port". The re-integration processing unit 25 can recreate an integration rule in which it is possible to make the number of flow entries become the smallest, by the use of the first and second re-integration methods mentioned above, and re-integrate a flow entry group before integration.

<Effects of Embodiment 1>

According to the Embodiment 1, a flow entry group before integration is stored in the flow information storage unit 24A, the present integration rule (integration of flow entries) is released in response to addition of a flow entry, and re-integration processing is performed. Thereby, it is possible to re-integrate the flow entry group in an integration rule in which the number of flow entries becomes the smallest according to the content of the flow entry group at that time.

As a result, an integration entry group re-integrated in the integration rule in which the number of flow entries becomes the smallest is registered in the flow table 31 of each of the switches 3. Thereby, it is possible to substantially increase the number of flows registered in the flow table 31. Therefore, it is possible to increase the number of hosts 4 housed in each of the switches 3 and intend the improvement of scalability of a network system.

In the Embodiment 1, at the time of re-integration, a flow entry group before integration is held in the controller 2A and is not held in the switch 3. Therefore, the capacity of the memory (RAM 72) of the switch 3 is not pressured by information on the flow entries before integration.

<Examples of Modification or Variation>

Here, the Embodiment 1 illustrates an example where information on flow entries before integration is stored in the flow information storage unit 24A installed inside the controller 2A. However, there is no problem as long as the information on flow entries before integration is preserved on the controller side. For example, the information on flow entries before integration may be stored in a storage unit installed outside the controller 2A, and the controller 2A may optionally acquire the information on flow entries before integration from the external storage unit.

For example, the information on flow entries before integration may be preserved in an external apparatus, and the controller 2A may optionally acquire the information on flow entries before integrates from the external apparatus. For example, the external apparatus includes a computer (for example, server) that can perform communication with the controller 2A through a network, and a portable storage device (for example, semiconductor memory 60) detachable to the controller 2A.

Moreover, the Embodiment 1 describes an example where the controller 2A and the switch 3 are mounted on different physical devices, but the controller 2A and at least one switch 3 may be mounted on the same physical device. In this case, the controller 2A and the switch 3 are connected through an internal network (which is one example of a network) installed in the physical device. Moreover, the switch 3 may be either a physical switch or a virtual switch.

Moreover, the Embodiment 1 illustrates OpenFlow as one example of an SDN network, but other communication standards than OpenFlow are possible as long as they are communication standards in which the switch has a flow table and the controller has a mechanism so as to generate a flow entry and transmit it to the switch. For example, the Embodiment 1 is applicable to a network system that conforms to I2RS (Interface to the Routing System).

[Embodiment 2]

Next, Embodiment 2 is described. Since the configuration of the Embodiment 2 includes common parts with the Embodiment 1, different points are mainly described and explanation of the common points is omitted. In the Embodiment 1, re-integration processing is performed in response to addition of a flow entry. By contrast with this, in the Embodiment 2, the re-integration processing is performed (started) when it is difficult to integrate an additional flow entry in the present integration rule (the number of flow entries increases).

Figure 14:
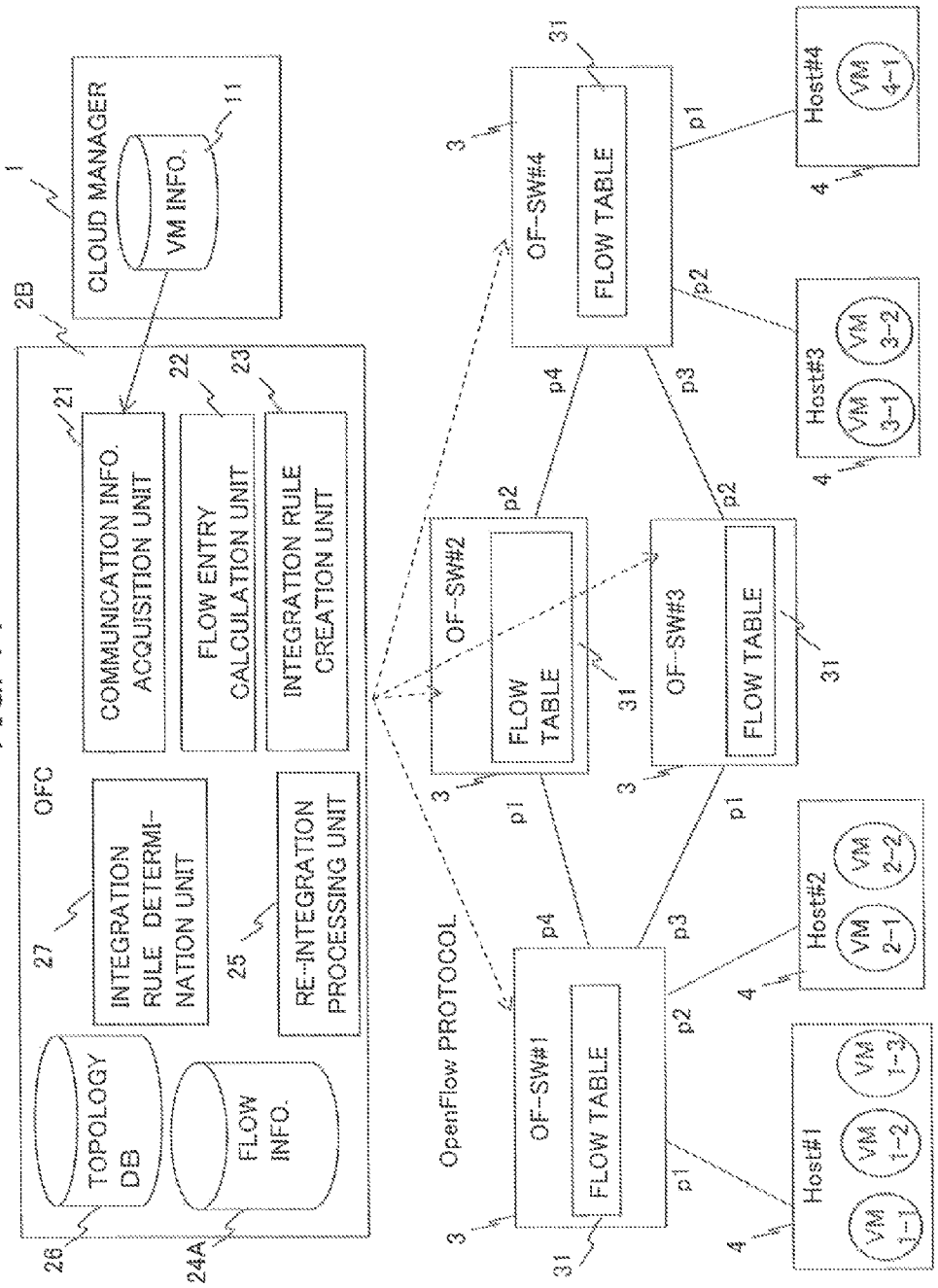
FIG. 14 is a diagram illustrating a configuration example of a network system according to Embodiment 2.

FIG. 14 is a diagram illustrating a configuration example of a network system according to the Embodiment 2. In FIG. 14, a controller 2B is different from the controller 2A of the Embodiment 1 in further including an integration rule determination unit 27. Other components are the same as the Embodiment 1 and therefore explanation thereof is omitted.

Figure 15:
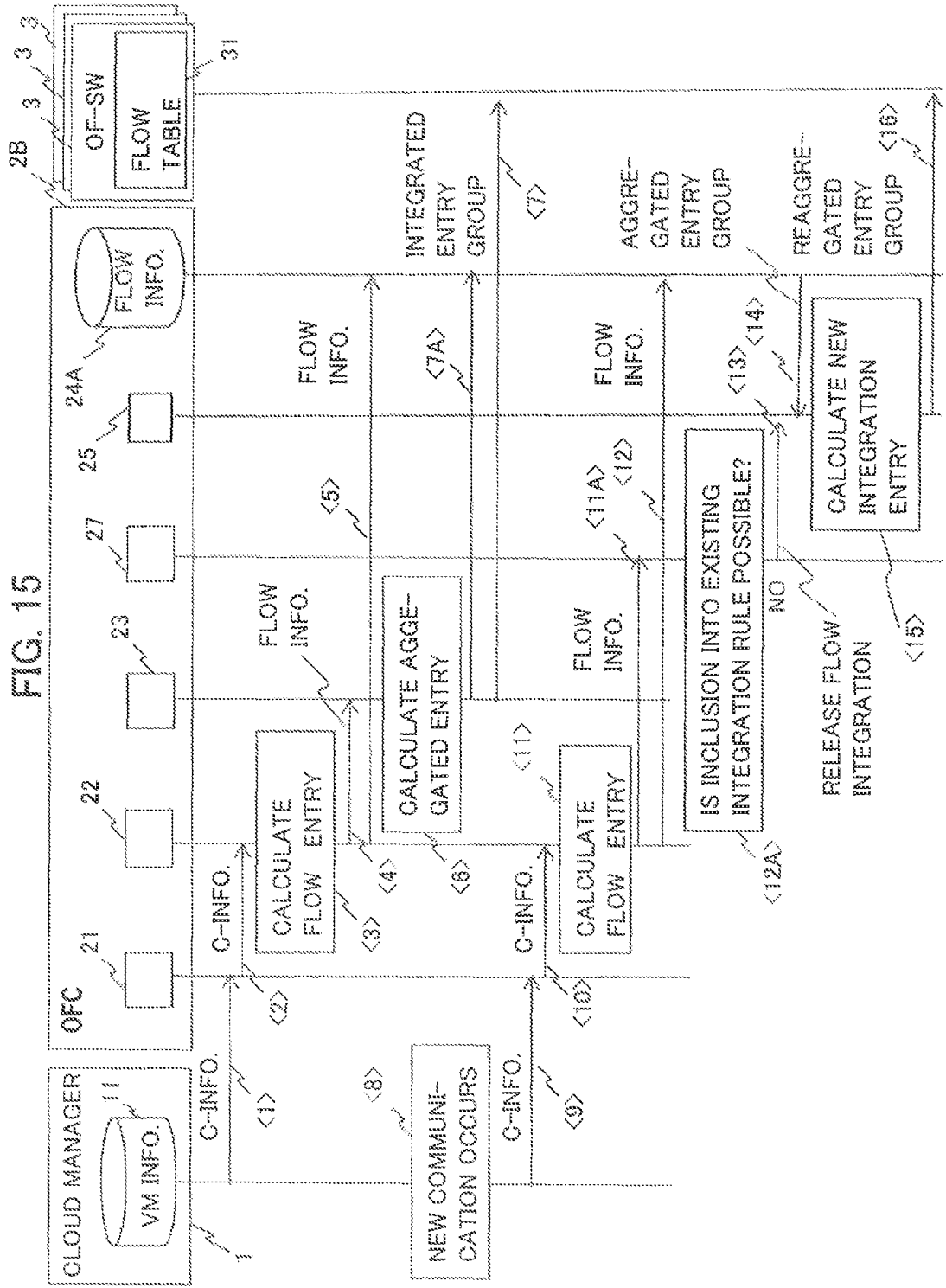
FIG. 15 is a sequence diagram illustrating an operation example in Embodiment 2.

FIG. 15 is a sequence diagram illustrating an operation example in the Embodiment 2. In the sequence of FIG. 15, operation of <7A>, <11A> and <12A> is added to the sequence of the Embodiment 1 (FIG. 6).

In the Embodiment 2, an integration entry group transmitted to the switch 3 is stored in the flow information storage unit 24A (FIG. 15 <7A>). Moreover, in the Embodiment 2, the flow entry calculation unit 22 gives a flow entry group to the integration rule determination unit 27 (FIG. 15 <11A>).

Then, the integration rule determination unit 27 determines whether the additional flow entries can be integrated in an existing integration rule. For example, the integration rule determination unit 27 acquires an integration entry group and an additional flow entry from the flow information storage unit 24A and determines whether the additional flow entry can be integrated into the integration entries in the integration entry group.

At this time, for example, as illustrated in table (5) and table (6) of FIG. 4, in a case where it is difficult to integrate the additional flow entry into the integration entries in the existing (current) integration rule, the integration of flow entries is released (FIG. 15 <13>). Afterward, re-integration processing similar to the Embodiment 1 is performed. A re-integration entry group is stored in the flow information storage unit 24A.

Here, in a case where the additional flow entry can be integrated into the integration entries, processing with respect to the switch 3 is not performed. It is because variation is not caused in the registration content of the flow table 31. Except for the above, the operation example is the same as the Embodiment 1 and therefore explanation thereof is omitted.

For example, the controller 2B of the Embodiment 2 can apply the information processing apparatus 50 illustrated in FIG. 7. The CPU 51 can operate as the integration rule determination unit 27 by program execution. The configuration of the switch 3 is the same as the Embodiment 1.

Figure 16:
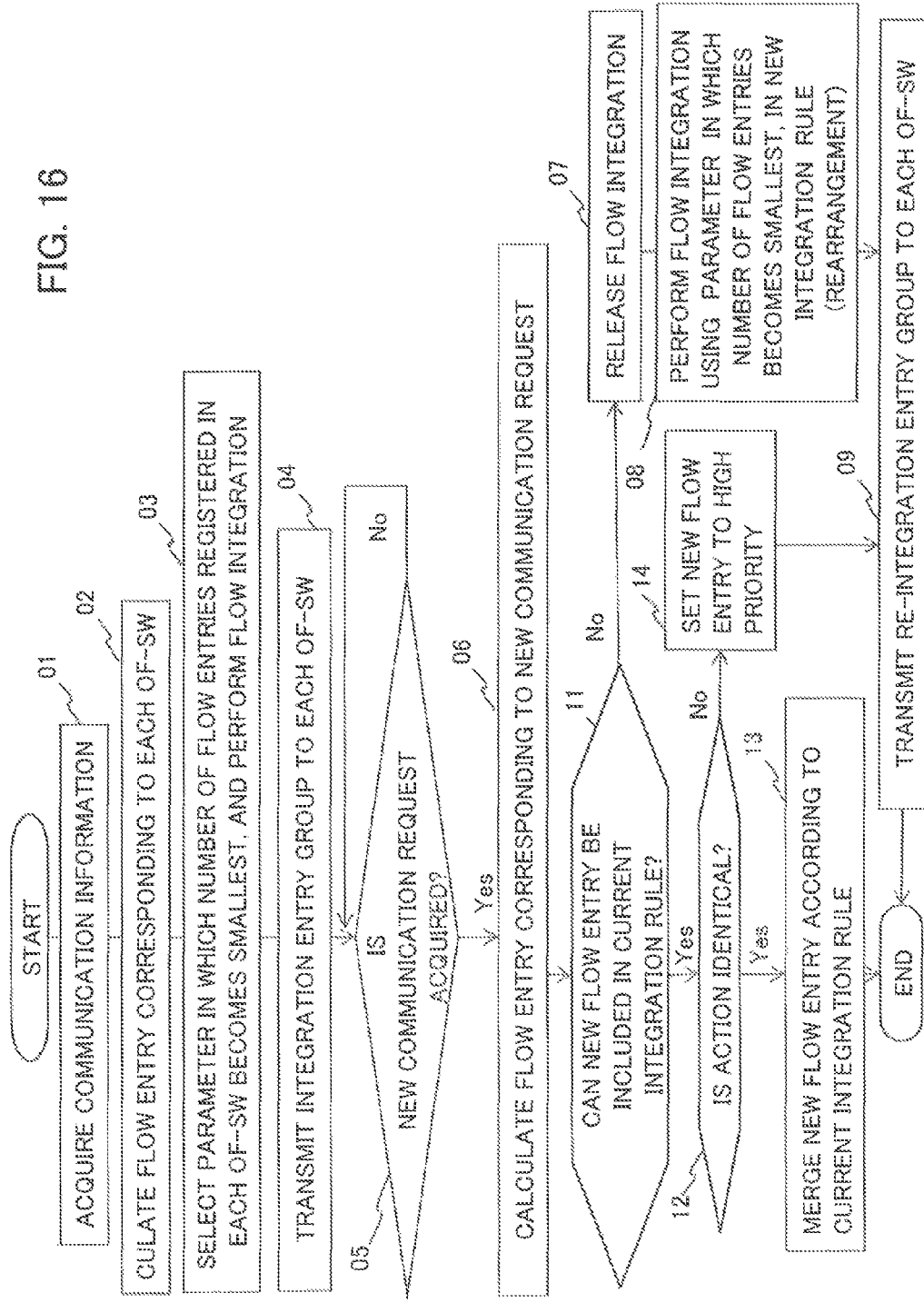
FIG. 16 is a flowchart illustrating processing of a CPU in Embodiment 2.

FIG. 16 is a flowchart illustrating processing of the CPU in the Embodiment 2. In the flowchart illustrated in FIG. 16, processing in 11 to 14 is added to the flowchart of the Embodiment 1 (FIG. 9).

In 11 of FIG. 16, the CPU 51 determines whether a new (additional) flow entry can be included in the present integration rule. For example, the CPU 51 acquires an integration entry group and an additional flow entry from the flow information storage unit 24A and determines whether the additional flow entry has the same parameter value as the value of a parameter used in the existing integration rule. When it is difficult to include the additional entry in the integration rule (11, NO), processing after 07 is performed, and re-integration processing is performed.

By contrast with this, when the additional flow entry can be included in the integration rule (11, YES), the CPU 51 determines whether "Action" of the additional flow entry is identical with "Action" of the integration entries (12). If the action is identical, the CPU 51 merges the additional flow entry into the integration entries according to the present integration rule (13). By contrast with this, if the action is not identical, the new flow entry is set to high priority (14).

Figure 17:
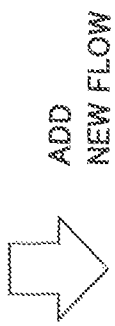
FIG. 17 is an explanatory diagram of a concrete example of processing in 12 and 14 in FIG. 16.

FIG. 17 is an explanatory diagram for a concrete example of the processing in 12 and 14 in FIG. 16. Table A in FIG. 17 indicates a certain integration entry group. Afterward, a case is assumed where a flow entry with "Src IP=10.0.0.5", "Dst IP=10.0.0.1", "VLAN-ID=20" and "Action=Out=p3" is added as an additional flow entry.

The additional flow entry has a VLAN-ID of "20" which is the same value as the VLAN-ID of integration entry X on the upper side of table A in FIG. 17. Therefore, in the processing in 11 in FIG. 16, it is determined that it can be included in an integration rule. However, value "Out=p3" of "Action" in the additional flow entry is different from value "Out=p4" of above-mentioned integration entry X. Therefore, as illustrated in table B of FIG. 17, the CPU 51 disposes the additional flow entry in the upper row of integration entry X (see flow entry Y of table B).

Afterward, an integration entry group like table B is transmitted to the corresponding switch 3 and registered in the flow table 31. The switch 3 refers to the flow entry group of the flow table 31 in order from the top. Therefore, it refers to flow entry Y earlier than flow entry X. In other words, flow entry Y is used more preferentially than flow entry X. Therefore, by transmitting the integration entry group like table B to the switch 3, the same effect as high-priority setting of the additional flow entry is acquired.

In the switch 3, the source ID address and the destination IP address are referred to in addition for a packet whose value of VLAN-ID is "20", and, in a case where they agree with flow entry X, the packet is output from port "p3". Regarding a packet of VLAN-ID=20 having the source ID address and destination IP address stored in flow entry X, the switch 3 outputs it from port "p4" according to flow entry X. Thereby, it is possible to perform proper transfer processing on packets of "VLAN-ID=20".

According to the Embodiment 2, it is possible to acquire an operational effect similar to the Embodiment 1. In addition, according to the Embodiment 2, re-integration processing is started on a condition that it is difficult to integrate an additional flow entry in the present integration rule. Therefore, when the additional flow entry can be integrated in the present integration rule, the re-integration processing is not performed. Thereby, it is possible to avoid useless re-integration processing and effectively use calculation resources of the controller 2B.

Here, in the Embodiment 2, the processing illustrated in 11 to 13 of FIG. 16 can be applied in the re-integration processing in 08. Moreover, the Embodiment 2 has described an example where the integration entry group (and re-integration entry group) transmitted to each of the switches 3 is stored in the flow information storage unit 24A, but, in a case where whether it can be included in the existing integration rule can be determined in the processing in <12A>, it is possible to adopt a configuration in which the integration entry group and the re-integration entry group are not stored in the flow information storage unit 24A. In addition, in the processing illustrated in FIG. 16, when the processing in 09 and the processing in 13 end, it can be changed such that processing returns to 05.

[Embodiment 3]

Next, Embodiment 3 is described. Since the configuration of the Embodiment 3 includes common parts with the Embodiment 1 and the Embodiment 2, different points are mainly described and explanation thereof is omitted. In the Embodiment 2, re-integration processing is performed in response to the fact that it is difficult to integrate an additional flow entry in an existing integration rule. By contrast with this, in the Embodiment 3, the re-integration processing is performed (started) in response to the fact that the number of flow entries exceeds a threshold according to addition of a flow entry.

Figure 18:
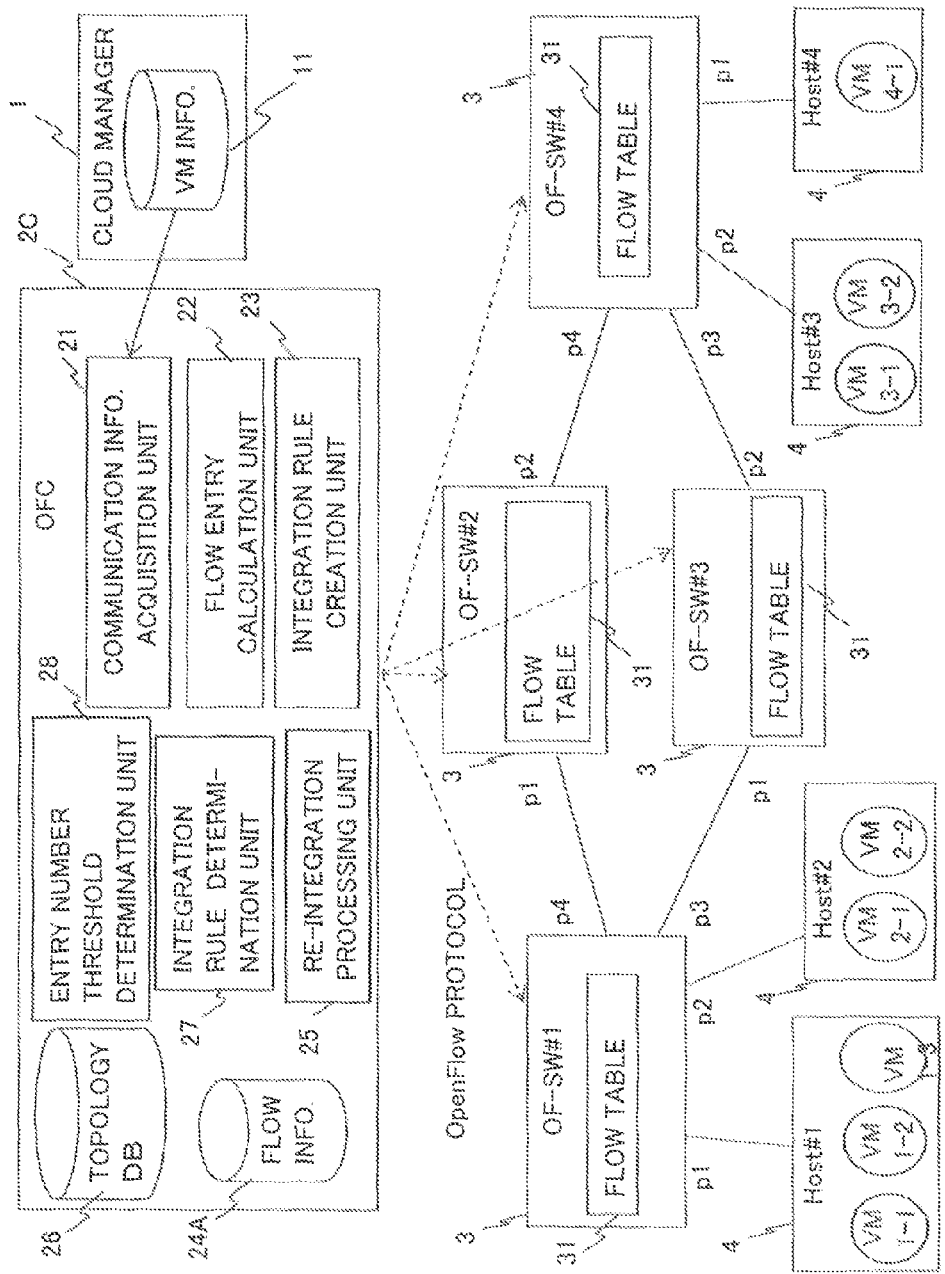
FIG. 18 is a diagram illustrating a configuration example of a network system according to Embodiment 3.

FIG. 18 is a diagram illustrating a configuration example of a network system according to the Embodiment 3. In FIG. 18, a controller 2C is different from the controller 2B of Embodiment 2 in further including an entry number threshold determination unit 28. Other components are the same as Embodiment 2 and therefore explanation thereof is omitted.

Figure 19:
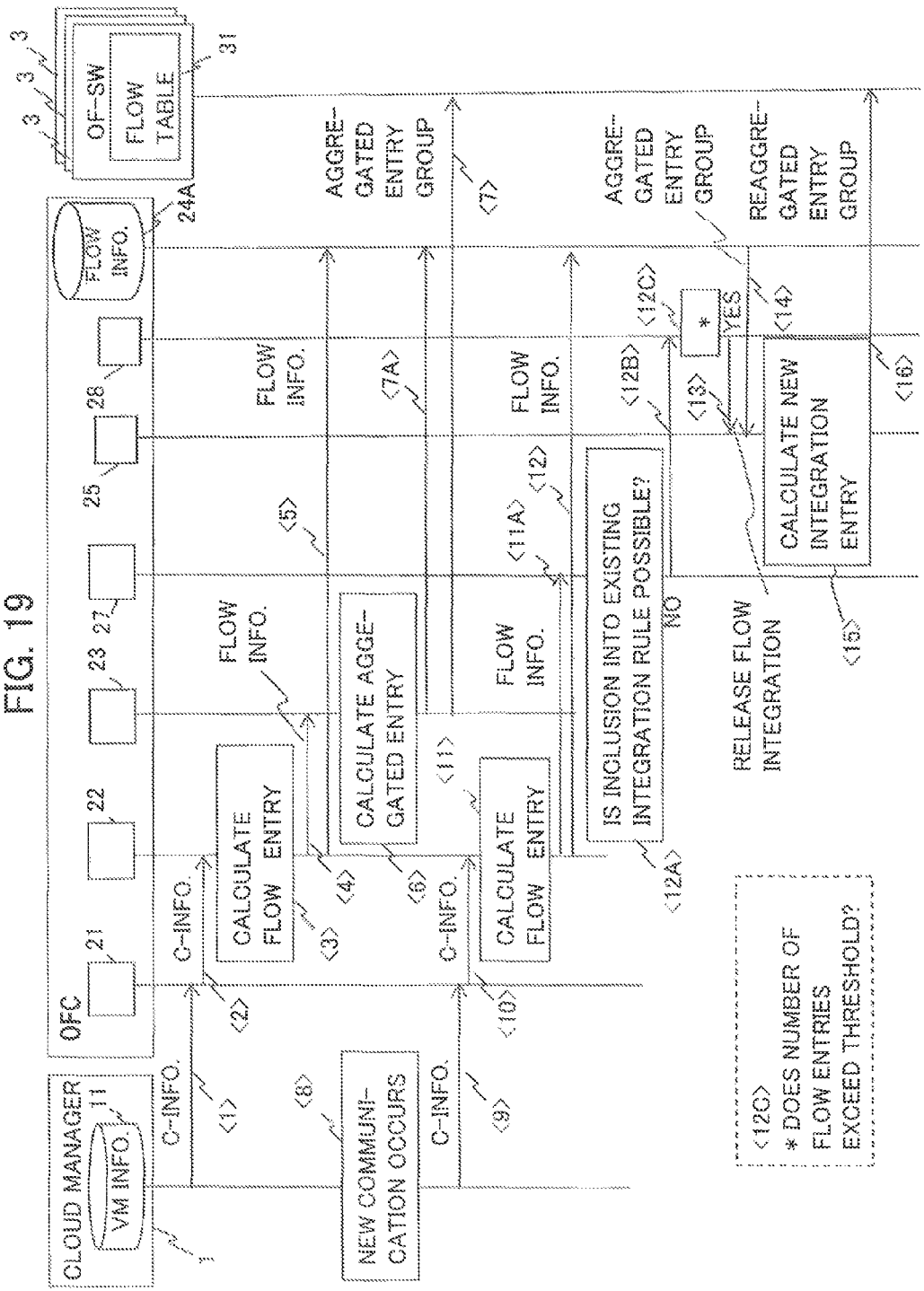
FIG. 19 is a sequence diagram illustrating an operation example in Embodiment 3.

FIG. 19 is a sequence diagram illustrating an operation example in the Embodiment 3. The sequence of FIG. 19 is different from the Embodiment 2 in adding the operation of <12B> and <12C> to the sequence of the Embodiment 2 (FIG. 15).

That is, in the Embodiment 3, when it is determined that it is difficult to integrate an additional flow entry in an existing integration rule in <12A>, an integration result in the present integration rule related to an integration entry group and the additional flow entry is given to the entry number threshold determination unit 28 (FIG. 19 <12B>). For example, a set of integration entries and non-integration flow entry like table (6) of FIG. 4 is given to the entry number threshold determination unit 28.

The entry number threshold determination unit 28 holds a threshold for the number of flow entries related to the flow table 31 beforehand. For example, the threshold is stored in the HDD 54 beforehand. The entry number threshold determination unit 28 calculates the number of flow entries in the set of flow entries and determines whether the number of flow entries exceeds the threshold (FIG. 19 <12C>). At this time, in a case where the number of flow entries exceeds the threshold, the entry number threshold determination unit 28 notifies the release of flow entry integration to the re-integration processing unit 25 (FIG. 19 <13>). Except for the above, the operation example is the same as the Embodiment 2 and therefore explanation thereof is omitted.

The controller 2B according to the Embodiment 3 can also apply the information processing apparatus 50. The CPU 51 can operate as the entry number threshold determination unit 28 by program execution. FIG. 20 is a flowchart illustrating processing of the CPU in Embodiment 3. In the flowchart illustrated in FIG. 20, processing in 15 is added to the flowchart of Embodiment 2 (FIG. 16).

The processing in 15 is inserted between the processing in 11 and the processing in 07 in FIG. 16. In 15, a CPU 51 determines whether the number of flow entries exceeds a threshold. In a case where the number of flow entries exceeds the threshold, (15, YES), the CPU 51 advances processing to 07 and performs re-integration processing.

By contrast with this, in a case where the number of flow entries does not exceed the threshold (15, NO), the processing proceeds to 09, and an integration entry group as an integration result of an additional flow entry in the current integration rule is transmitted to the corresponding switch 3. Except for the above, the processing illustrated in FIG. 19 is the same as the processing illustrated in FIG. 16 and therefore explanation thereof is omitted.

According to the Embodiment 3, it is possible to acquire an operational effect similar to the Embodiment 1 and the Embodiment 2. However, in the Embodiment 3, re-integration processing is performed in a case where the number of flow entries exceeds a threshold. Thus, when the frequency of re-integration processing is reduced, it is possible to avoid the waste of calculation resources due to frequent implementation of the re-integration processing and the waste of network resources due to transmission of a re-integration entry group to the switch 3 according to the re-integration processing.

Here, the processing in 11 to 14 may be omitted from FIG. 20 relating to the Embodiment 3. That is, the re-integration processing may be performed in response to the fact that a flow entry is added and the number of flow entries exceeds a threshold. The configurations described in the Embodiments 1 to 3 can be arbitrarily combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control apparatus supplying a switch with an entry, the switch including a table formed with one or more entries, each entry including identification information of a packet and operation information, the switch detecting an entry corresponding to an input packet from the table based on identification information of the input packet to perform an action with respect to the input packet based on the operation information included in the detected entry, the control apparatus comprising:
   a generation unit configured to generate a plurality of entries to be supplied to the switch, to generate an integration entry that the plurality of entries are integrated according to an integration rule, and to hold the plurality of entries before the integration in a storage;
   a transmission unit configured to transmit the integration entry to the switch;
   an acquisition unit configured to acquire the plurality of entries before the integration from the storage; and
   a control unit configured to perform re-integration processing including generating a re-integration entry that the plurality of entries before the integration and an additional entry are integration according to a re-integration rule that is created based on content of the plurality of entries before the integration and the additional entry and to transmit the re-integration entry to the switch.

2. The control apparatus according to claim 1, wherein the control unit is configured to start the re-integration processing when the additional entry is generated.

3. The control apparatus according to claim 1, wherein the control unit is configured to start the re-integration processing when the additional entry is not integrated into the integration entry based on the integration rule.

4. The control apparatus according to claim 1, wherein the control unit is configured to start the re-integration processing when a sum of the plurality of entries and the additional entry exceeds a predetermined value.

5. The control apparatus according to claim 1, wherein the control unit is configured to integrate the plurality of entries and the additional entry by the re-integration rule using a parameter among a plurality of parameters included in the identification information, the parameter being different from parameters used in the integration rule.

6. The control apparatus according to claim 1, wherein the control unit is configured to integrate the plurality of entries and the additional entry by the re-integration rule using a parameter among a plurality of parameters included in the identification information, the parameter being different from parameter candidates including parameters used in the integration rule.

7. The control apparatus according to claim 1, wherein when the identification information included in the additional entry, which is to be integrated into the integration entry generated using the integration rule, matches the identification information included in the integration entry while the operation information included in the additional entry is different from the operation information included in the integration entry, the control unit controls the transmission unit to transmit the additional entry to the switch, the additional entry having a format in which the additional entry is used more preferentially than the integration entry in the switch.

8. The control apparatus according to claim 1, wherein the control apparatus operates as an OpenFlow controller that supplies the switch that operates as an OpenFlow switch with the plurality of entries by use of an OpenFlow protocol.

9. A method for supplying a switch with an entry, the switch including a table formed with one or more entries, each entry including identification information of a packet and operation information, the switch detecting an entry corresponding to an input packet from the table based on identification information of the input packet to perform an action with respect to the input packet based on the operation information included in the detected entry, the method comprising:

generating, using a processor, a plurality of entries to be supplied to the switch;

generating, using the processor, an integration entry that the plurality of entries are integrated according to an integration rule;

holding, using the processor, the plurality of entries before the integration in a storage;

transmitting, using a transmission unit, the integration entry to the switch;

acquiring, using the processor, the plurality of entries before the integration from the storage; and performing, using the processor, re-integration processing including generating a re-integration entry that the plurality of entries before the integration and an additional entry are integrated according to re-integration rule that is created based on content of the plurality of entries before the integration and the additional entry and transmitting the re-integration entry to the switch.

\* \* \* \* \*